Feb. 5, 1963     D. O. NEWSOME     3,076,436

CATTLE OILER

Filed July 10, 1961

*INVENTOR.*
Donald O. Newsome
BY
*John H. Widdowson*
*ATTORNEY*

United States Patent Office 3,076,436
Patented Feb. 5, 1963

3,076,436
CATTLE OILER
Donald O. Newsome, 302 E. Santa Fe, Garden City, Kans.
Filed July 10, 1961, Ser. No. 122,825
6 Claims. (Cl. 119—157)

This invention relates to a cattle oiler, and more particularly to a new construction for holding and applying oil, insecticide and the like, to cattle or other farm animals. More particularly, the invention relates to a construction whereby a plurality of tubular elements forming reservoirs can be connected together and supported by posts or the like so that when an animal passes thereunder engaging the device oil or insecticide will be applied to the contacted portions of the animal.

Cattle oilers of various constructions have been known in the prior art. The known devices are primarily elaborate constructions for spraying or applying by contact liquids of various types. These devices are complicated in construction and expensive to make and use. Furthermore, no construction has been provided in which it is easy to replace any portion of the oiler which contacts the animal itself and wears faster than the rest of the structure. Also, the prior art devices are primarily extremely long units which must be saturated with liquid their entire length, and since only a portion of the oiler is used at any one time, a relatively large amount of the liquid will not be used, but will only evaporate.

In accordance with the present invention, a new cattle oiler construction has been provided which overcomes the many difficulties of the prior art constructions. The cattle oiler of the present invention is inexpensive to construct and can be secured to a plurality of other cattle oilers to provide the desired length without wasteful use of the insecticide or the like therein. Also, the animal contacting portions of the present oiler are removable from the main portion and are easily replaceable, thereby reducing the maintenance cost.

The oiler of the invention has a liquid containing reservoir or chamber. Means are provided for continually supplying liquid from the chamber to the exterior thereof. A suitable fabric is secured to the oiler and receives the liquid. When cattle and the like pass beneath the oiler the liquid on the fabric will be applied directly to the contacted portion of the animal.

Accordingly it is an object of this invention to provide a new and improved cattle oiler.

Another object of the invention is to provide a new oiler which is inexpensive and easy to construct.

A further object of the invention is to provide a new oiler construction in which the animal contacting portions are removably mounted thereon to be easily removed and replaced.

A still further object of the invention is to provide a new cattle oiler construction whereby a plurality of said oilers can be connected end to end and secured to spaced posts to provide a cattle oiling unit of variable length for use with one or more animals at a time.

A still further object of the invention is to provide a new cattle oiler construction in which a tubular reservoir receives the liquid and a felt member supplies the liquid from the reservoir to a surrounding felt fabric, from which it is supplied to a depending fabric member to be applied directly to the animal.

Various other objects, advantages, and features of the invention will become apparent from the following description, taken in connection with the accompanying drawings, in which.

Figure 1:
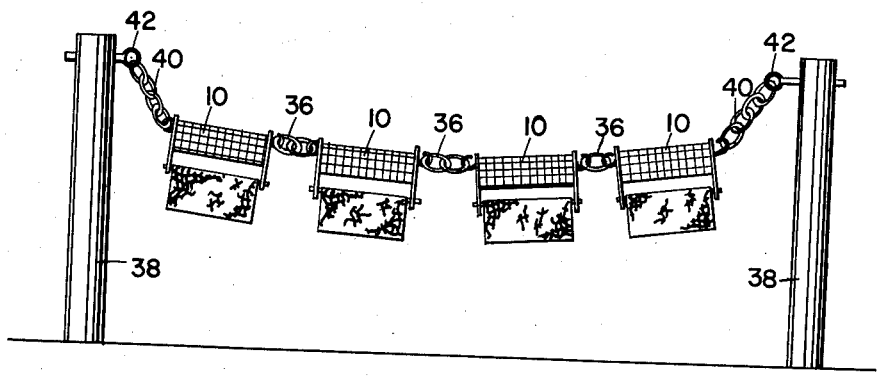
FIG. 1 is a view showing a plurality of the cattle oilers of the invention secured to spaced posts.

The following is a discussion and description of a preferred specific embodiment of the new cattle oiler of the invention, such being made with reference to the drawings, whereon the same reference numerals are used to indicate the same or similar parts and/or structure. It is to be understood that such discussion and description is not to unduly limit the scope of the invention.

Figure 2:
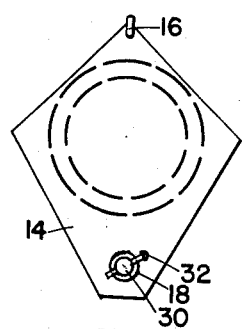
FIG. 2 is an enlarged end view of one of the end plates used on the cattle oiler of the invention.

Referring now to the drawings in detail, the cattle oiler of the invention is shown generally at 10. The oiler 10 includes an elongated tubular member 12, such as a pipe or the like, which is preferably closed at each end by a plate 14 which is secured thereto in any suitable manner, such as by welds 15. The plate 14 is preferably a vertically elongated diamond shaped plate made of metal as best seen in FIG. 2. The oiler 10 is made with one of the plates 14 at each end of the tubular member or pipe 12, which forms with the pipe an oil or insecticide reservoir. The plates 14 have securing elements, such as hooks 16 secured thereto and extending from the outer side of the plate 14. The hook 16 is preferably mounted at the top center portion of the plate 14 as shown. An aperture 18 is provided in the opposite or lower portion of the diamond shaped plate 14.

A longitudinally extending slot 20 is cut in the top of the pipe 12. The slot 20 preferably extends the major length of the oiler 10, however, it can extend only a portion thereof. A common wick 22 is provided and is positioned within the reservoir formed by the pipe 12 and the end plates 14, and at least a portion of the wick 22 extends through the slot 20.

The pipe or tubular member 12 and the wick 22 with the portion thereof extending from the tubular member is wrapped with an absorbent material, such as a felt fabric 24 or the like. The felt material 24 preferably extends the entire distance between the plates 14 at each end of the tubular member 12. The felt material can be made in either one piece or it can be a strip of material which is wrapped around the tubular member 12 and a portion of felt material 24 can form wick 22, if desired.

A metal lath or grating 26 surrounds the felt material 24 and holds it onto the tubular member 12. While a metal material is preferred for the lath or grating 26, it will be apparent to those skilled in the art that other materials can also be used if desired.

The lath 26 permits liquid on the felt material 24 to be evenly distributed around the circumference of the material and does not impair to any extent the flow of the liquid. The lath 26 can be permanently secured in this position by welds 15 which hold the tubular member 12 and the end plates 14. When this is done, a single weld can be used to form the member all at once.

Figure 3:
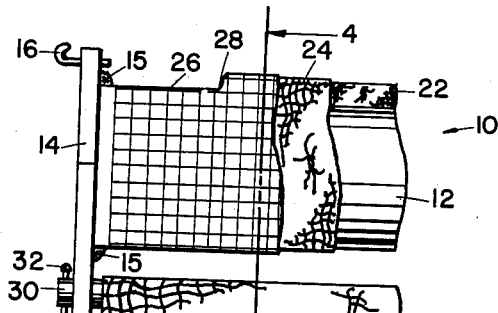
FIG. 3 is an enlarged partial side elevation view partially cut away to show a preferred construction of the cattle oiler of the invention.
Figure 4:
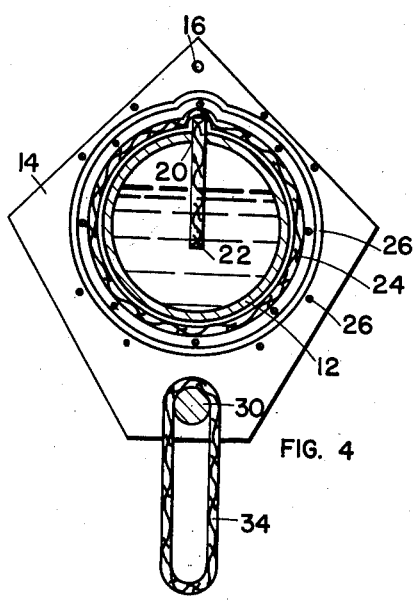
FIG. 4 is a cross section view approximate in size taken along line 4—4 of FIG. 3.

A suitable filler hole 28 can be provided and is preferably positioned in the top of the pipe or tubular member 12 adjacent one of the plates 14 as shown in FIG. 3. The filler hole 28 is provided to allow access to the interior of the tubular member 12 so that the oil or insecticide can be easily received within the reservoir. The filler hole 28 can be formed by enlarging the slot 20 in the top of the tubular member 12 near the plate 14, or it can be formed adjacent to the slot 20. Also, a suitable opening can be provided by terminating the felt 24 and the wick 22 short of the plate 14. The hole 28 can be covered if desired.

A rod 30 has been provided which extends between the plates 14 and is received by the apertures 18 in the lower portion of the plate 14. The rod 30 is removably mounted in the plates 14 in any suitable manner, such as the cotter pins 32 shown in the drawings. An absorbent material 34, which is preferably endless and extends from one of the plates 14 to the other plate 14, surrounds and is mounted on the rod 30. The absorbent material 34 is dimensioned so as to hang loosely from the rod 30. The apertures 18 in the plates 14 are positioned so that when the rod 30 and the absorbent material 34 are in place thereon the absorbent material 34 will be adjacent to and possibly even in slight contact with the lath 26 and felt material 24 on the cylindrical portion of the oiler. The absorbent material 34 can be of any type of material which readily and rapidly absorbs fluids of the type being used, and a suitable material would be a burlap sack material readily available on all farms and ranches.

In operation, oil, insecticide or the like is poured into the tubular member 12 and the reservoir therein until at least a portion of the wick 22 is covered. The device is then mounted between suitable supports by mounting means connecting the supports to the hook 16. The oil or insecticide solution in the reservoir will be supplied through the wick 22 to the felt material 24, and from there the liquid will be either applied directly to the absorbent material 34 or will drip from the felt 24 to the absorbent material 34. The oilers 10 are preferably loosely mounted so that as an animal walks beneath them the absorbent material 34 will engage the body of the animal, causing it to turn about the rod 30 to continuously supply liquid thereto. The contact of the absorbent material 34 with the animal will cause a certain amount of rocking of the oiler about the axis of the hook 16 which will splash or spill more oil onto the wick 22 and possibly through the slot 20 directly to the felt 24 so that a supply of oil, insecticide and the like is continuously supplied to the absorbent material.

The oiler 10 of the invention can be made sufficiently long so that only one unit is necessary for any desired application. However, it is deemed desirable to make the oilers 10 in shorter lengths and secure them together by short lengths of chain, cable or the like shown at 36 in FIG. 1, which are received by the hooks 16. A plurality of units 10 thus assembled can be secured to suitable supports, such as the posts 38 by additional lengths of chain 40 to connect the hook 16 of the end members with the eyes 42 which are mounted on the posts 38. The shorter length units 10 are desired since the posts 38 can then be spaced any suitable distance apart, depending upon the individual application, so that one or more of these units can be used to apply the oil, insecticide and the like to either one animal at a time or to a series of them which are driven between the posts 38. It is also seen that with the units connected together in the manner just described there will tend to be more swinging movement of the units, which insures an adequate supply of the liquid to the felt 24 and the absorbent material 34 during operation.

The present invention discloses a structure which is believed economically superior to the prior art devices. With the construction described the only wearing part on the oiler is the absorbent material 34, and by having the rod 30 removably mounted as described, the absorbent material 34 can be easily and readily replaced without the necessity of disturbing the upper portion of the unit 10. As stated above the absorbent material 34 can be the common burlap sack material, which is readily available on almost all farms. Also, with the present construction the liquid in the reservoir portion of the unit is not exposed directly to the atmosphere, thereby preventing rapid evaporation of this liquid. It is also noted that the device is easily constructed with a minimum amount of materials, all of which are well known and readily available.

While the invention has been described in connection with a preferred specific embodiment thereof, it will be understood that this description is intended to illustrate and not limit the scope of the invention, which is defined by the claims.

It will be evident to those skilled in the art that various modifications of this invention can be made, or followed, in the light of this description and discussion, without departing from the spirit of the disclosure or the scope of the claims.

I claim:

1. A cattle oiler comprising, in combination, an elongated tubular pipe having a longitudinally extending slot therein at the top thereof, each end of said pipe being closed by a vertically elongated diamond shaped metallic plate rigidly secured thereto, each of said plates having a hook secured near the top edge thereof on the outside face of said plates, said plates each having an aperture in the lower portion thereof, a flat elongated wick in said pipe and extending out of said pipe through said slot, a felt material positioned around said pipe and extending the entire distance between said plates, and a metal lath surrounding said felt and said pipe from one of said plates to the other of said plates to retain said felt thereon, said pipe having a filler hole in the top portion thereof adjacent one of said plates, a metallic rod extending between said plates, said rod being received by said apertures in the lower portion of said plates and removably secured to said plates, said apertures in said plates being positioned so that said rod is adjacent to and spaced from said lath and an endless absorbent material surrounding said rod from one of said plates to the other of said plates and hanging loosely therefrom, said absorbent material being spaced from said lath and loosely and rotatably positioned on said rod, said device being constructed and adapted so that a plurality of said oilers can be loosely connected end to end by lengths of chain and suspended between posts so that oil can be received in said pipe to cover a portion of said wick and so that cattle can tip said oilers into oil spilling position, and said oil will be continuously supplied to said felt by said wick, and said oil will be applied to said absorbent material from said felt as same is rotated about said rod in applying said material to the back of an animal.

2. A cattle oiler of the type described comprising, in combination, an elongated tubular pipe, each end of said pipe being closed by a metallic plate rigidly secured thereto, each of said plates having a hook secured near the top edge thereof on the outside surface of said plates, each of said plates having an aperture in the lower portion thereof, said pipe having an elongated opening in the top portion thereof, a wick positioned in said pipe and extending therefrom through said opening, a felt material positioned around said pipe between said plates, a lath surrounding said felt material, a rod extending between said plates in spaced relation to said lath and removably received by said apertures in the lower portion thereof, and an absorbent material surrounding and loosely hanging from said rod, said material being spaced from said lath and loosely and rotatably positioned on said rod, said device being constructed and adapted so that a plurality of said oilers can be loosely mounted end to end by lengths of chain connecting said hooks and suspended from spaced posts so that oil can be received in said pipe to cover said wick and be supplied therefrom through said felt material to said absorbent material to be applied to the back of an animal, said absorbent material being movable around said rod as a result of contact with an animal.

3. A cattle oiler comprising, in combination, a tubular member having an opening therein, two plates connected to said tubular member, the ends of said tubular member being closed by said plates, said tubular member and said plates forming a reservoir for the reception of a liquid, securing means on the outside face of each of said plates to secure said oiler to spaced supports, a wick material in said tubular member and extending through said opening, a felt material positioned around said tubular member, an open lath surrounding said felt material, a metal rod extending between and removably mounted on said plates adjacent to and spaced from the outer surface of said metal lath, and an endless piece of absorbent material mounted on said rod and hanging loosely therefrom, said absorbent material being spaced from said lath and loosely and rotatably positioned on said rod, said device being constructed and adapted so that oil, insecticide, or the like can be received within said reservoir and supplied therefrom through said wick and said felt to said absorbent material to be applied from said absorbent material to the back of an animal, said absorbent material being movable around said rod as a result of contact with an animal.

4. Oiler means for cattle or the like comprising, in combination, means defining a reservoir for oil, insecticides and the like, a piece of felt-like material operatively connected to said means defining a reservoir, means communicating between said piece of felt-like material and the interior of said means defining a reservoir to transfer oil, insecticide and the like therefrom to said piece of felt-like material, hanger means operatively connected to said means defining a reservoir and positioned in spaced relation to said piece of felt-like material, and an endless piece of absorbent material movably and rotatably mounted on said hanger means and positioned to receive oil, insecticide and the like from said piece of felt-like material and operable to transfer same to an animal upon contact therewith, said piece of absorbent material being movable around said hanger means upon contact with an animal.

5. A cattle oiling device comprising, in combination, a plurality of cattle oiling units, each of said units including a closed tubular member forming a reservoir for oil, insecticides and the like, felt material positioned around each of said tubular members, each of said units having a wick connecting said felt material with the interior of said tubular members, and a plurality of pieces of absorbent material, each of said units having one of said pieces of absorbent material rotatably mounted thereon in close proximity and in spaced relation to said felt material and positioned so that oil, insecticides and the like supplied to said felt material is received by said pieces of absorbent material, each of said units having hook means connected at the end portions thereof adjacent a top portion thereof, chain means positioned between each of said units and attached to said hook means to movably connect said units in assembled relation, two spaced supports, and additional chain means connected to said supports and end ones of said units, said cattle oiling device being constructed and adapted so that a plurality of said units are loosely mounted in spaced relation and suspended between said supports with oil, insecticides and the like in said tubular members being continuously supplied by said wicks and said pieces of felt material to said absorbent material, said absorbent material being rotated upon contact with the back of an animal or the like to thereby apply said oil, insecticide and the like to the back of the animal.

6. Cattle oiling means comprising, in combination, spaced supports, a plurality of oiler means, flexible mounting means connecting said oiler means to each other and connecting end ones of said oiler means to said supports, each of said oiler means having means defining a reservoir for oil, insecticides and the like, a plurality of pieces of felt-like material, each of said oiler means having one of said pieces of felt-like material operatively connected to said means defining a reservoir, each of said oiler means having means therewith communicating between said pieces of felt-like material and the interior of said means defining a reservoir to transfer oil, insecticides and the like therefrom to said pieces of felt-like material, each of said oiler means having hanger means operatively connected to said means defining a reservoir and positioned in spaced relation to said pieces of felt-like material, and a plurality of pieces of endless absorbent material, each of said oiler means having one of said endless pieces of absorbent material movably and rotatably mounted on said hanger means and positioned to receive oil, insecticide and the like from said pieces of felt-like material and operable to transfer same to an animal upon contact therewith, said pieces of absorbent material being movable around said hanger means upon contact with an animal or the like.

References Cited in the file of this patent
UNITED STATES PATENTS

| 987,433 | Crawford | Mar. 21, 1911 |
| 1,471,109 | Dick | Oct. 16, 1923 |
| 2,988,803 | Worden | Sept. 5, 1961 |